3,386,946
FILLED EPIHALOHYDRIN POLYMERS
William D. Willis, Limestone Acres, Delaware, assignor to Hercules Incorporated, a corporation of Delaware
No Drawing. Filed Apr. 26, 1966, Ser. No. 545,253
6 Claims. (Cl. 260—37)

This invention relates to cross-linked epihalohydrin polymers. More particularly, this invention relates to epihalohydrin polymers containing high surface area silicas.

It is known that high molecular weight polymers and copolymers of epihalohydrin can be cross-linked with urea, thiourea, ammonia, various polyamines or certain heterocyclic compounds in combination with a metal compound to produce rubbers that have numerous good attributes. It is also known that a reinforcing filler can be used to improve tensile strength. However, since the presence of high surface area silicas in other rubbers impart stiffening and impair flexing resistance, they were expected to have the same effect in epihalohydrin rubbers.

It has now unexpectedly been found that the presence of high surface area silicas, in reinforcing quantities, impart to epihalohydrin rubber compositions significant improvements in flexing resistance (i.e., flex life) and tear strength. These improved properties are advantageous for many uses of epihalohydrin polymers and particularly desirable in elastic fiber applications.

Any high molecular weight polymer of an epihalohydrin free of ethylenic unsaturation is suitable for the purpose of this invention. Such polymers can be homopolymers prepared by polymerizing a monomeric epihalohydrin, e.g. epifluorohydrin, epichlorohydrin, epibromohydrin, or epiiodohydrin. They can also be copolymers in which the repeating units are derived from mixtures in any proportion of two or more molecular species of monomeric epihalohydrin, such as, mixtures of epichlorohydrin and epibromohydrin or mixtures of epibromohydrin, epifluorohydrin, and epiiodohydrin. They can also be copolymers of epihalohydrins with one or more epoxides in which at least about 20%, preferably at least about 50%, by weight of the repeating units are derived from epihalohydrin, such as, a copolymer of propylene oxide and epichlorohydrin or a copolymer of ethylene oxide and epichlorohydrin. The polymer can be essentially wholly amorphous, a mixture of amorphous and crystalline polymers or essentially wholly crystalline. Generally, the amorphous polymers provide the most rubbery products. However, excellent rubbery products are obtained from mixtures of amorphous and crystalline polymers. In this case the amount of the crystallinity will preferably be less than about 30% by weight of the polymer or mixture of polymers.

The epihalohydrin polymers of this invention are essentially linear polyethers in which polymerization, at least in major part, has taken place through the epoxide linkage so that the polymer contains halomethyl groups attached to the main polymer chain. The homopolymers are believed to have the following general formula:

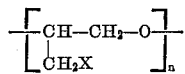

in which X is halogen and $n$ is a numeral designating the number of repeating units in the polymer. In the same way, when an epihalohydrin is copolymerized with one or more other epoxides (including other epihalohydrins), polymerization takes place through the epoxide linkage even though other polymerizable groups may be present, and it is apparent that such copolymers also contain halomethyl groups attached to the main polymer chain.

Typical of other epoxides that can be copolymerized with epihalohydrins to produce the polymers used in this invention include, by way of example, the monomers having the formula

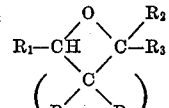

where $R_1$, $R_2$ and $R_3$ are hydrogen, alkyl, alkoxyalkyl or phenyl radicals, but at least one is hydrogen; $R_4$ and $R_5$ are hydrogen or alkyl and $n$ is 0–1. Exemplary of such monomers are the alkylene oxides such as ethylene oxide, propylene oxide, cis and trans butene-2 oxides, hexene-1 oxide, hexene-2 oxide, dodecene-1 oxide, isobutylene epoxide, and the like; cycloaliphatic epoxides such as cyclohexene oxides, etc.; phenyl alkylene oxides such as styrene oxide, etc.; saturated glycidyl ethers such as methyl glycidyl ether, ethyl glycidyl ether, isopropyl glycidyl ether, tert.-butyl glycidyl ether, phenyl glycidyl ether, ethylphenyl glycidyl ether, etc.; and oxetanes such as trimethylene oxide, 3,3-dimethyloxetane, 2-methyloxetane, etc.

The epihalohydrin polymers used in this invention are characterized by having a weight average molecular weight of at least about 40,000 and preferably at least about 100,000. Molecular weights of this order usually correspond to reduced specific viscosity, $\eta_{sp/c}$, of at least about 0.2 and preferably at least about 0.5. Reduced specific viscosities are generally determined on solutions of the polymers at 0.1% concentration in α-chloronaphthalene at 100° C., although polymers high in epifluorohydrin content are preferably determined on solutions thereof at 0.1% concentration in cyclohexanone at 50° C.

The polymers employed in this invention can be prepared by contacting an epihalohydrin monomer, mixture of epihalohydrin monomers, or mixture of epihalohydrin monomer and at least one other epoxide with an organoaluminum compound, preferably one which has been reacted with about 0.01 to about 1.5 moles of a chelating agent such as acetylacetone, benzoylacetone, acetoacetic acid, ethyl glycolate, oxalic acid, glyoxal monoxime, etc. and/or reacted with from about 0.1 to about 1.5 moles of water per mole of the organoaluminum compound. Exemplary of the organoaluminum compounds that can be so reacted with the chelating agent and/or water and used as a catalyst are triethylaluminum, triisobutylaluminum, diethylaluminum hydride, etc.

The polymerization reaction is generally carried out in the presence of an inert, liquid, organic diluent but can be carried out in an essentially bulk polymerization process. Suitable diluents which can be used for the polymerization are the ethers, halogenated hydrocarbons, hydrocarbons, and mixtures of such diluents. The temperature of the polymerization process can be varied over a wide range, generally from about −80° C. to about 250° C., and while atmospheric pressure is usually used, the pressure can be varied from subatmospheric up to several atmospheres.

These epihalohydrin polymers generally contain a small amount (i.e., from about 0.1% to about 2% by weight) of antioxidant added at the time of their preparation. It may in some cases be desirable to add a small additional amount of antioxidant at the time of cross-linking the polymer. Exemplary of the most preferred antioxidants are phenyl-β-naphthylamine, di-β-naphthyl-p-phenylenediamine, sym-di-β-naphthyl-p-phenylenediamine, N-isooctyl-p-aminophenol, the reaction product of diphenylamine and acetone, polymerized trimethyldihydroquinoline, nickel dibutyldithiocarbamate, 4,4′-thio-bis(6-tert.-butyl-m-cresol), the reaction product of crotonaldehyde and 3-methyl-6-tert.-butyl phenol, etc.

As pointed out above, various polyamines can be used as cross-linking agents for epihalohydrin polymers. Exemplary of such polyamines are aliphatic amines such as ethylenediamine, propylenediamine, tetramethylenediamine, hexamethylenediamine, diethylenetriamine, etc.; cycloaliphatic amines such as melamine, piperazine, pyrazine, etc.; aromatic amines such as p-phenylene diamine, naphthalenediamine, biphenyldiamine etc. and polymeric amines such as poly(2-methyl-5-vinyl pyridine), etc. Instead of the free amine, a salt of the amine can be used. Internal salts of the amines can also be used, as for example, hexamethylenediamine carbamate, which type of salt decomposes to the free amine at or below the curing temperature. In addition to the polyamines, the epihalohydrin polymers can be cross-linked with a heterocyclic compound selected from the group consisting of 2-mercaptoimidazolines and 2-mercaptopyrimidines in combination with at least one metal compound selected from the group consisting of salts of aromatic carboxylic acids, salts of aliphatic carboxylic acids, salts of carbonic acid, salts of phosphorous acid, salts of silicic acid and oxides of the metals of Groups II–A, II–B and IV–A of the Periodic Table (Lang's Handbook of Chemistry, 8th edition, pages 56–57, 1952). In addition to the above cross-linking agents, urea, thiourea, ammonia and ammonium salts can also be used.

When cross-linking with a urea, thiourea, ammonia or polyamine, the amount employed will depend primarily upon the degree of cross-linking desired. Generally, from about 0.25% to about 10% and preferably from about 0.5% to about 5% of the polyamine based on the weight of the polymer will be employed. When using a heterocyclic compound in combination with a metal compound to effect cross-linking, the optimum amount of each compound will again depend upon the degree of cross-linking desired. Generally, however, the amounts added (based on the weight of the polymer) will be within the following ranges: metal compound, from about 2% to about 20%; heterocyclic compound, from about 0.2% to about 10%.

Any silica filler having a surface area of at least about 300 sq. m./g. can be used in accordance with this invention. Exemplary silica fillers are the fumed silicas, etc. Various amounts of the high surface area silica filler can be employed depending upon the specific results desired. In general, however, from about 10% to about 40% of silica filler based on the weight of the polymer will be employed.

The cross-linking agents and silica filler can be compounded or admixed with the polymer in any desired fashion. For example, they can be uniformly blended by simply milling on a conventional rubber mill or a Banbury mixer. By this means, the ingredients are uniformly distributed throughout the polymer and uniform cross-linking is effected when the blend is subjected to heat. It is generally preferable to mill at temperatures within the range of from about 70° F. to about 200° F. However, the blends are highly scorch-resistant below about 250° F. Other methods of compounding the ingredients with the polymer will be apparent to those skilled in the art.

The conditions under which cross-linking is effected can be varied over a wide range. Cross-linking can be effected in minutes at temperatures around 300° F. or in days at room temperature. In general, the cross-linking temperature will be within the range of from about 250° F. to about 350° F. The time will vary inversely with the temperature and will range from about 10 to about 120 minutes and preferably from about 20 minutes to about 60 minutes. Cross-linking will generally be conducted under a compression of about 500 p.s.i. in a suitable press, although it can be conducted in the open without pressure.

In addition to the cross-linking agents and silica fillers, other ingredients can also be incorporated. The additives commonly used in rubber vulcanization can be used here also, as, for example, extenders, pigments, plasticizers, softeners, processing lubricants, stabilizers, etc. The presence of a stabilizer and, in particular an acid acceptor, such as a lead compound (e.g. red lead oxide, etc.), calcium stearate or magnesium oxide is particularly beneficial.

The following examples will illustrate the invention, all parts and percentages being by weight.

GENERAL PROCEDURE FOR COMPOUNDING OF COMPOSITIONS

In all of the examples, polymer stocks were made up by mixing on a two-roll mill. The temperatures of the rolls were maintained at approximately 160° F. (front roll) and 190° F. (back roll) during the entire compounding procedure. The polymer was first added to the mill and when it banded (within about 2 minutes) a processing lubricant was added, followed by the complete addition of the silica filler. After the addition of the filler the antioxidant, acid acceptor stabilizer and cross-linking agent are added. On completion of the addition of compounding ingredients, the milling sheet was crosscut 12 times and end-rolled 6 times to insure good dispersion of the compounding ingredients. All stocks were cured in two-part preheated steel molds maintained at 340° F. under a mold pressure of approximately 550 p.s.i. Specimen thickness was approximately 25 mils. The cured sheets were allowed to cool to room temperature over a minimum of 2 hours prior to cutting specimens for testing.

Examples 1–4

In these examples an epichlorohydrin—ethylene oxide copolymer was milled and cross-linked with 2-mercaptoimidazoline. All of the polymers in the examples were filled with fumed silica. The polymer in Example 1 contained a low surface area silica. The polymer in Example 2 contained a medium surface area silica and the polymers in Examples 3 and 4 contained high surface area silicas. The cure time was 45 minutes in each example. The amounts of the ingredients (by parts) in each formulation along with various physical properties of the cross-linked products and cut threads from the cross-linked products are given in Table I.

TABLE I

|  | 1 | 2 | 3 | 4 |
|---|---|---|---|---|
| Epichlorohydrin—ethylene oxide copolymer (68 wt. percent epichlorohydrin, RSV 5.0) | 100 | 100 | 100 | 100 |
| Zinc Stearate | 0.75 | 0.75 | 0.75 | 0.75 |
| Fumed Silica (surface area 195 sq. m./g.) | 30 | | | |
| Fumed Silica (surface area 200 sq. m./g.) | | 30 | | |
| Fumed Silica (surface area 325 sq. m./g.) | | | 30 | |
| Fumed Silica (surface area 395 sq. m./g.) | | | | 30 |
| Red Lead | 3.0 | 3.0 | 3.0 | 3.0 |
| Zinc Oxide | 2.0 | 2.0 | 2.0 | 2.0 |
| Nickel Dibutyl Dithiocarbamate | 1.0 | 1.0 | 1.0 | 1.0 |
| 2-mercaptoimidazoline | 1.5 | 1.5 | 1.5 | 1.5 |
| Mooney Viscosity (ML 4/212° F.) | 126 | 127 | 151 | 138 |

|  | 1 | | 2 | | 3 | | 4 | |
|---|---|---|---|---|---|---|---|---|
|  | Unaged | Aged [a] | Unaged | Aged [a] | Unaged | Aged [a] | Unaged | Aged [a] |
| 300% Modulus, p.s.i. | 780 | 1,640 | 870 | 1,580 | 890 | 1,410 | 730 | 1,210 |
| 500% Modulus, p.s.i. | 1,440 | 3,010 | 1,620 | 3,050 | 1,685 | 2,720 | 1,380 | 2,450 |
| Tensile Strength, p.s.i. | 5,035 | 3,365 | 5,210 | 3,705 | 6,085 | 3,310 | 5,695 | 3,350 |
| Maximum Elongation, percent | 795 | 570 | 765 | 595 | 805 | 570 | 850 | 610 |
| Shore "A" Hardness | 72 | 74 | 73 | 73 | 74 | 75 | 75 | 75 |
| Break Set, percent | 15 | 10 | 10 | 5 | 20 | 10 | 25 | 15 |
| Graves Tear, lbs./inch | 180 | | 200 | | 251 | | 238 | |
| Flex Life (No. of flexes to break 10 threads) [b] | 7,600 | | 9,000 | | 16,500 | | 17,000 | |

[a] 1 day/300° F. in air-circulating oven.
[b] Ten cut threads of about 6,600 denier are flexed to 300% elongation and back to 50% elongation at a rate of 100 cycles per minute

Examples 5 and 6

In these examples, a nonleaded white epichlorohydrin—ethylene oxide copolymer was milled and cross-linked with 2-mercaptoimidazoline. The polymer is Example 5 contained a medium surface area silica while the polymer in Example 6 contained a high surface area silica. The cure time was 45 minutes in each example. The amounts of the ingredients (by parts) in each formulation along with various physical properties of the cross-linked products and cut threads from the cross-linked products are given in Table II.

TABLE II

|  | 5 | 6 |
|---|---|---|
| Epichlorohydrin—ethylene oxide copolymer (68 wt. percent epichlorohydrin, RSV 5.0) | 100 | 100 |
| Calcium Stearate | 2.0 | 2.0 |
| Fumed Silica (Surface area 200 sq. m./g.) | 30 | |
| Fumed Silica (Surface area 325 sq. m./g.) | | 30 |
| Zinc Oxide | 2.0 | 2.0 |
| 2-mercaptoimidazoline | 1.5 | 1.5 |
|  | Unaged | Unaged |
| 300% Modulus, p.s.i | 720 | 730 |
| Tensile Strength, p.s.i | 4,200 | 4,480 |
| Maximum Elongation, percent | 950 | 1,100 |
| Shore "A" Hardness | 68 | 69 |
| Break Set, percent | 10 | 10 |
| Graves Tear, lbs./inch | 190 | 218 |
| Flex Life (No. of flexes to break 10 threads) a | 9,000 | 20,000 | a See Table I.

Examples 7–10

In these examples, epicholorhydrin—ethylene oxide copolymer was blended with epichlorohydrin homopolymers having a high ash content and a low ash content. The polymer blends in Examples 7 and 10 contained low surface area silica while the polymer blends in Examples 8 and 9 contained high surface area silica. All blends were cross-linked with 2-mercaptoimidazoline. The cure time was 45 minutes in each example. The amounts of the ingredients (by parts) in each formulation along with various physical properties of the cross-linked products and cut threads from the cross-linked products are given in Table III.

TABLE III

|  | 7 | 8 | 9 | 10 |
|---|---|---|---|---|
| Poly(epichlorohydrin) (low ash, 0% crystallinity, RSV 1.4) | 53 | 53 | | |
| Epichlorohydrin—ethylene oxide copolymer (68 wt. percent epichlorohydrin, RSV 5.0) | 47 | 47 | | |
| Poly(epichlorohydrin) (high ash, 12% crystallinity, RSV 1.55) | | | 50 | 50 |
| Epichlorohydrin—ethylene oxide copolymer (63 wt. percent epichlorohydrin, RSV 4.97) | | | 50 | 50 |
| Fumed Silica (surface area 195 sq. m./g.) | 30 | | | 30 |
| Fumed Silica (surface area 325 sq. m./g.) | | 30 | 30 | |
| Zinc Stearate | 0.75 | 0.75 | 0.75 | 0.75 |
| Nickel Dibutyl Dithiocarbamate | 1.0 | 1.0 | 1.0 | 1.0 |
| Red Lead | 3.0 | 3.0 | 3.0 | 3.0 |
| Zinc Oxide | 2.0 | 2.0 | 2.0 | 2.0 |
| 2-Mercaptoimidazoline | 1.5 | 1.5 | 1.5 | 1.5 |
|  | Unaged | Unaged | Unaged | Unaged |
| 300% Modulus, p.s.i | 890 | 850 | 1,080 | 1,095 |
| Tensile Strength, p.s.i | 4,150 | 4,400 | 4,775 | 4,500 |
| Maximum Elongation, percent | 825 | 900 | 895 | 850 |
| Shore "A" Hardness | 66 | 68 | 78 | 70 |
| Break Set, percent | 30 | 30 | 20 | 20 |
| Flex Life (flexes to break 10 threads) a | 15,000 | 18,000 | 19,500 | 16,000 | a See Table I.

Examples 11 and 12

In these examples, polyepichlorohydrin was milled and cross-linked with 2-mercaptopyrimidine. The polymer in Example 11 contained a low surface area silica while the polymer in Example 12 contained a high surface area silica. The cure time was 45 minutes in each example. The amounts of the ingredients (by parts) in each formulation along with various physical properties of the cross-linked products and cut threads from the cross-linked products are given in Table IV.

TABLE IV

|  | 11 | 12 |
|---|---|---|
| Polyepichlorohydrin (amorphous, RSV 1.4) | 100 | 100 |
| Zinc Stearate | 1.0 | 1.0 |
| Fumed Silica (surface area 195 sq. m./g.) | 30 | |
| Fumed Silica (surface area 325 sq. m./g.) | | 30 |
| Zinc Oxide | 2.0 | 2.0 |
| Calcium stearate | 2.0 | 2.0 |
| 2-Mercaptopyrimidine | 2.0 | 2.0 |
|  | Unaged | Unaged |
| 300% Modulus, p.s.i | 850 | 800 |
| Tensile Strength, p.s.i | 2,300 | 2,400 |
| Maximum Elongation, percent | 750 | 780 |
| Shore "A" Hardness | 62 | 65 |
| Graves Tear, lbs./inch | 150 | 225 |
| Flex Life (flexes to break 10 threads) a | 2,000 | 15,000 | a See Table I.

Examples 13 and 14

In these examples, polyepichlorohydrin was milled and cross-linked with hexamethylenediamine carbamate. The polymer in Example 13 contained a low surface area silica while the polymer in Example 14 contained a high surface area silica. The cure time was 45 minutes in each example. The amounts of the ingredients (by parts) in each formulation along with various physical properties of the cross-linked products and cut threads from the cross-linked products are given in Table V.

TABLE V

|  | 13 | 14 |
|---|---|---|
| Polyepichlorohydrin (amorphous, RSV 1.4) | 100 | 100 |
| Zinc Stearate | 1.0 | 1.0 |
| Fumed Silica (surface area 195 sq. m./g.) | 30 | |
| Fumed Silica (surface area 325 sq. m./g.) | | 30 |
| Zinc Oxide | 2.0 | 2.0 |
| Calcium Stearate | 2.0 | 2.0 |
| Hexamethylenediaminecarbamate | 1.5 | 1.5 |
|  | Unaged | Unaged |
| 300% Modulus, p.s.i | 820 | 750 |
| Tensile Strength, p.s.i | 2,450 | 2,600 |
| Maximum Elongation, percent | 750 | 800 |
| Shore "A" Hardness | 61 | 64 |
| Graves Tear, lbs./inch | 140 | 215 |
| Flex Life (flexes to break 10 threads) a | 5,000 | 20,000 | a See Table I.

What I claim and desire to protect by Letters Patent is:

1. In the process of cross-linking a polymer of epihalohydrin which comprises heating said polymer in admixture with a cross-linking agent selected from the group consisting of urea, thiourea, ammonia, ammonium salts, polyamines, hydrogen halide salts of polyamines, polyamine carbamates and a combination of at least one metal compound selected from salts of aromatic carboxylic acids, salts of aliphatic carboxylic acids, salts of carbonic acid, salts of phosphorous acid, salts of silicic acid and oxides of the metals of Groups II–A, II–B, and IV–A of the Periodic Table and an agent selected from the group consisting of 2-mercaptoimidazolines and 2-mercaptopyrimidines the improvement of compounding said polymer with from about 10% to about 40% by weight of a silica having a surface area of at least about 300 sq. m./g., said epihalohydrin polymer being selected from the group consisting of homopolymers of epihalohydrins, copolymers of at least two different epihalohydrins and copolymers of an epihalohydrin with at least one other epoxide having the formula

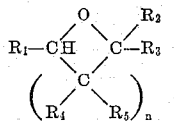

where $R_1$, $R_2$ and $R_3$ are radicals selected from the group consisting of hydrogen, alkyl, alkoxyalkyl and phenyl, but at least one being hydrogen, $R_4$ and $R_5$ are radicals selected from the group consisting of hydrogen and alkyl and $n$ is 0 to 1.

2. The process of claim 1 wherein the silica filler is fumed silica.

3. A cross-linked polymer of epihalohydrin prepared by compounding said polymer with from about 10% to about 40% by weight of a silica filler having a surface area of at least about 300 sq. m./g., and heating said polymer in admixture with a cross-linking agent selected from the group consisting of urea, thiourea, ammonia, ammonium salts, polyamines, hydrogen halide salts of polyamines, polyamine carbamates and a combination of at least one metal compound selected from salts of aromatic carboxylic acids, salts of aliphatic carboxylic acids, salts of carbonic acid, salts of phosphorous acid, salts of silicic acid and oxides of the metals of Groups II–A, II–B, and IV–A of the Periodic Table and an agent selected from the group consisting of 2-mercaptoimidazolines and 2-mercaptopyrimidines, said epihalohydrin polymer being selected from the group consisting of homopolymers of epihalohydrins, copolymers of at least two different epihalohydrins and copolymers of an epihalohydrin with at least one other epoxide having the formula

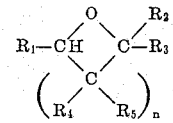

where $R_1$, $R_2$ and $R_3$ are radicals selected from the group consisting of hydrogen, alkyl, alkoxyalkyl and phenyl, but at least one being hydrogen, $R_4$ and $R_5$ are radicals selected from the group consisting of hydrogen and alkyl and $n$ is 0 to 1.

4. The product of claim 3 wherein the polymer of epihalohydrin is polyepichlorohydrin.

5. The product of claim 3 wherein the polymer of epihalohydrin is a blend of a copolymer of epichlorohydrin and ethylene oxide with polyepichlorohydrin.

6. The product of claim 3 wherein the polymer of epihalohydrin is a copolymer of epichlorohydrin and ethylene oxide.

References Cited

UNITED STATES PATENTS

| | | |
|---|---|---|
| 3,239,486 | 3/1966 | Willis. |
| 3,231,551 | 1/1966 | Herold. |
| 3,310,504 | 3/1967 | Vandenberg. |
| 3,313,741 | 3/1967 | Uelzmann. |
| 3,026,270 | 3/1962 | Robinson. |

OTHER REFERENCES

Gruber: I & EC Product Research & Development, vol. 3, No. 3, September 1964, pp.194–199.

Kraus: Reinforcement of Elastomers, Interscience Publishers, 1965, pp. 410 and 411.

JULIUS FROME, *Primary Examiner.*